July 2, 1929. A. F. SHULER Re. 17,348

BROODER

Original Filed Oct. 9, 1922

Andrew F. Shuler, INVENTOR.
Deceased,
Mary M. Shuler and Winford O. Shuler,
Executors,
By Vernon C. Hodges, their ATTORNEY.

Reissued July 2, 1929. Re. 17,348

UNITED STATES PATENT OFFICE.

ANDREW F. SHULER, DECEASED, LATE OF ARCANUM, OHIO, BY MARY M. SHULER, OF ARCANUM, OHIO, AND WINFORD B. SHULER, OF DAYTON, OHIO, EXECUTORS, ASSIGNORS TO H. M. SHEER COMPANY, OF QUINCY, ILLINOIS.

BROODER.

Original No. 1,627,346, dated May 3, 1927, Serial No. 593,343, filed October 9, 1922. Application for reissue filed July 8, 1927. Serial No. 204,352.

This invention relates to brooders for chicks and the like.

One object of the invention is to provide a brooder of a simple, durable construction, the hood of which will be of such a character that access may be had to all parts thereof through a suitable opening.

Other objects of the invention will appear as the device is described in detail.

Figure 1:
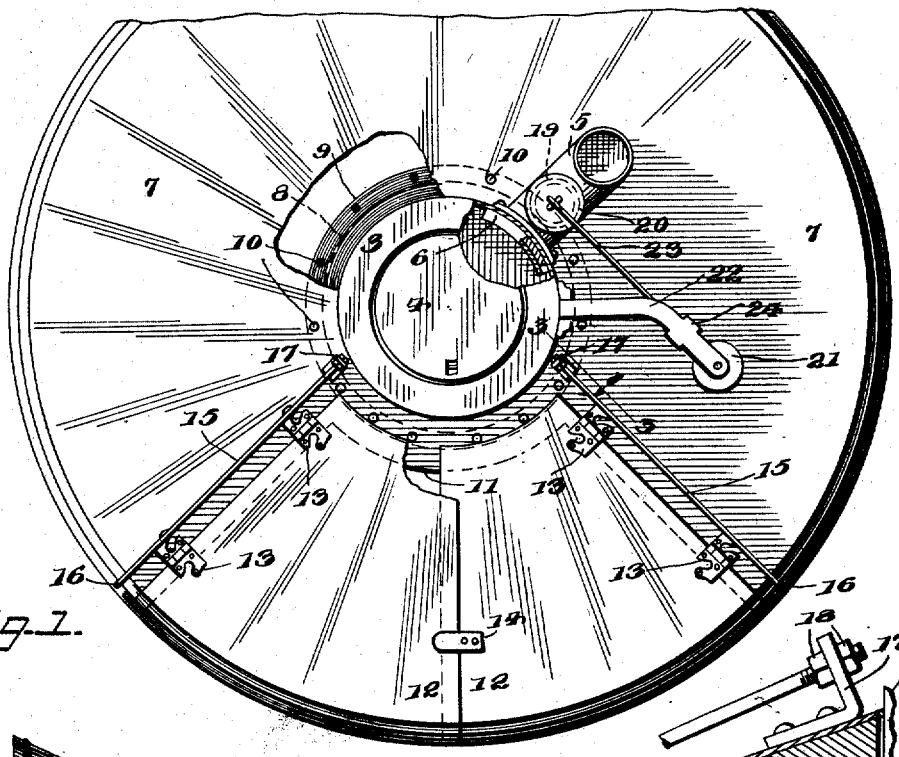
Fig. 1 is a plan view of a brooder embodying the invention, partly broken away.
Figure 2:
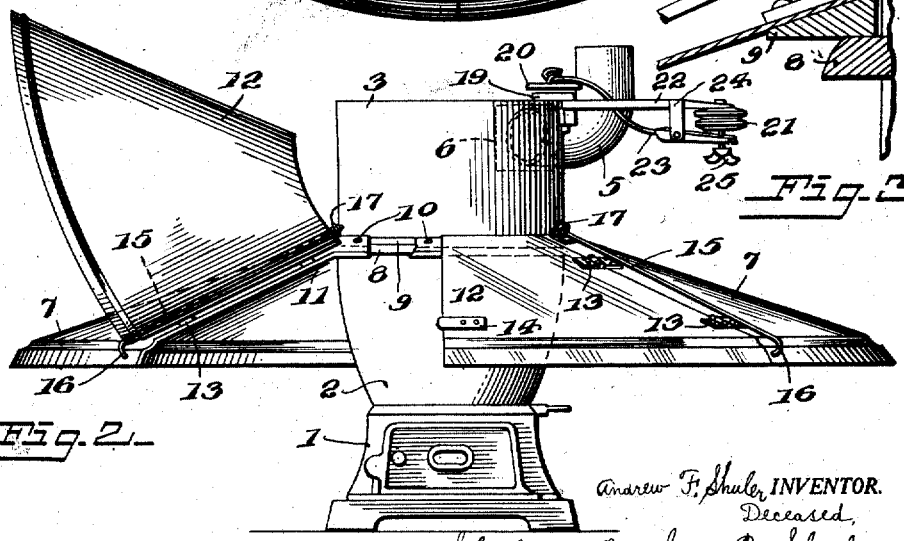
Fig. 2 is a side elevation of the same with one shutter open.
Figure 3:
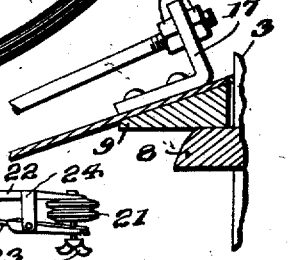
Fig. 3 is a section taken on the line 3—3 of Fig. 1.

In these drawings there is illustrated one embodiment of the invention, which comprises a heater, or stove, consisting of a base 1, a fire bowl 2, mounted on the base and having its upper portion of greater diameter than its lower portion, and a cylindrical portion 3 mounted on the upper end of the fire bowl and having in its top an opening through which fuel may be fed to the fire, this opening being closed by the usual stove lid 4. An outlet pipe 5 for the products of combustion is connected with the cylindrical portion 3 near the top thereof and is here shown in the form of an elbow, the outer end of which may be connected with a stove pipe of suitable length. A baffle 6 extends across the inner end of the outlet pipe and is open at its ends and bottom, but closed at the top, so as to permit the passage of smoke and gases, but to prevent solid matter from entering the pipe.

A hover or canopy extends about and is supported by the stove, or heater, and, as here shown, comprises a hood 7 having a central opening to permit it to be placed about the heater and having in one side thereof an opening through which access may be had to the base of the heater to regulate the fire, remove ashes, etc., and which also permits the space beneath the hover to be cleaned. In order that all space beneath the hover may be accessible through the opening the hover as a whole is rotatably mounted on the heater so that the opening may be moved to any side of the heater. The hover may be of any desired construction and may be mounted upon a heater in any desired manner, but in the present instance the upper cylindrical portion 3 of the heater has an outwardly extending ledge, or flange, 8 and the hover comprises a ring of metal 9 which extends about the heater and rests upon this flange. The main portion, or hood of the hover, which is shown at 7, is secured to this ring by means of bolts, or rivets, 10. The central portion of the hood is preferably continuous and forms an unbroken circle about the heater and the outer portion of the hood is cut away on one side thereof, as shown at 11, to provide the opening through which access is had to the space beneath the hover. This opening is of less width than the width of the hood and, therefore, the central portion of the hood is not broken, but is continuous. The hover may be reinforced at its outer edge in any suitable manner, as by a wire extending entirely about the same and secured thereto in the manner which is customary in reinforcing sheet metal. The opening 11 may be closed by a movable closure of any suitable kind but as here shown there are employed two shutters 12 which are hinged at their opposite edges to the hood at the respective edges of the opening. Preferably the shutters overlap both the central portion of the hood and the edge portions thereof adjacent to the opening, the hinges 13 being spaced short distances from the edges of the opening. It is also preferred that the shutters should overlap one another at their meeting edges and there is shown one shutter as provided with a clip 14 to extend over the other and retain them in their proper overlapping positions. The edges of the hood adjacent to the opening may be reinforced in any desired manner and in the present construction there are employed brace rods 15, the outer ends of which are bent to form hooks 16 which extend through the edge portions of the hood, and the inner ends of which are connected at points above the hood with brackets 17 rigidly secured to the hood and the ring 9. The connections between the rods and the brackets are preferably formed by nuts 18 which permit of the rods being adjusted to support the edges of the hood in the proper positions. It will be apparent, therefore, that the hover as a whole comprises a continuous circular portion which is rotatably mounted upon the heater so that the opening in the hood may be moved into any desired position, with relation to the heater. Further, it will be apparent, that the hover as a whole may be lifted from the stove by removing the elbow 5 and the controlling arm, which will be hereinafter described, by tilting the same to enable one side of the ring to clear that edge of the heater opposite the elbow.

The outlet pipe, or elbow, 5 is provided on the outside of the heater and between its ends with an opening 19 which may be closed by a damper 20. This damper is adjusted to control the draft through the pipe by means of a thermostat 21 which is carried by an arm 22 rigidly secured to the heater and is connected with one end of a lever 23 pivotally mounted on the brackets 24 carried by the arm 22 and having its other end connected with the damper 20. The arrangement is such that the expansion and contraction of the thermostat will cause the damper to be raised or lowered, thus regulating the draft and the fire. The amount of movement imparted to the damper by the thermostat may be controlled by a thumb nut, or other suitable device 25 and it will be noted that the arrangement of thermostatic control is entirely above the hover and is so arranged that it is readily accessible for adjustment or other purpose, and, further, that its operation will not be interfered with by the chicks roosting on the same, as is frequently the case when it is beneath the hover. Ordinarily the difference between the temperature beneath the the hover and that above the same will not interfere with the correct regulation of the temperature beneath the hover, because the thermostat may be adjusted to maintain the desired temperature beneath the hover. In the event difficulty should be experienced, under certain conditions, due to this difference in temperature, it can be readily overcome by permitting the warm air from beneath the hover to escape through an opening in the hover arranged directly beneath the thermostat so that the warm air will come in contact with the thermostat. The opening may be controlled in any suitable manner. With the present construction, this result would be accomplished by rotating the hover to bring the shutters directly beneath the thermostat and then securing the shutters in a partially open position so that the warm air could escape upwardly therefrom in contact with the thermostat.

It will be apparent that the brooder as a whole is of a very simple, durable construction, the stove having a large capacity and the hover being of such a construction and arrangement that it may be strongly built and access had to the space beneath the same on all sides of the heater through a suitable opening. Further, the controlling device, as has been stated, is readily accessible.

While there has been shown and described one embodiment of the invention, it is desired to be understood that there should be no limitation to the details thereof as various modifications may occur to a person skilled in the art.

Having now fully described the invention, what we claim as new and desire to secure by Letters Patent is:

1. In a brooder, a heater, a hover having a continuous relatively narrow inner portion supported by said heater and having its outer portion cut away on one side thereof to form an opening extending from said inner portion through the outer edge of said hover, a movable closure for said opening, and rods connected with said inner portion and with the outer edge of said hover at the respective sides of said opening to support the outer edge of said hover at the lateral edges of said opening.

2. In a brooder, a heater, a hover comprising a ring extending about and rotatably supported on said heater, a hood supported by and extending outwardly from said ring and having an opening in one side thereof, and a closure hinged to the lateral edge of said opening and supported by said ring when in its closed position.

3. In a brooder combination with a stove, of a canopy removably resting concentric therewith and capable of being rotated, and having an opening in the side extending from the outer edge inwardly approximately to the point of support, whereby to afford clearance space to the stove for an operator when access to the stove is required, and means for closing said opening.

4. A brooder including a heater, a canopy having an opening at the center through which a portion of the heater extends, and whereby the canopy is rotatably supported thereon, the canopy having an opening in the side which extends from the outer edge toward the center, and a closure hinged at an edge thereof to a lateral edge of the opening.

5. In a brooder, the combination of a heater, a canopy extending about and supported by said heater, means of support for the canopy permitting rotation thereof about the heater, said canopy having an opening in the body thereof extending from the extreme outer edge to a point approximately at the center, and a closure for said opening.

6. In a brooder, the combination of a heater, a hover comprising a ring extending about and rotatably supported on said heater, a hood supported by and extending outwardly from said ring and having an opening in a side thereof extending from the outer edge toward the center, and a closure for said opening.

7. In a brooder, the combination of a heater, a canopy extending about said heater, means of support for the canopy permitting rotation thereof about the heater, said canopy having an opening in the body thereof extending inwardly from the outer edge, and a closure for said opening.

8. In a brooder, the combination of a heater, a sheet metal canopy having a central opening for receiving a portion of the heater, reinforcing means extending about the edges of said opening, supporting means for engaging said reinforcing means and permitting rotation thereof about the heater, said canopy having an opening in the body portion thereof extending from the outer edge toward the center, and a closure for said opening.

In testimony whereof we affix our signatures.

MARY M. SHULER,
WINFORD B. SHULER,
*Executors of Andrew F. Shuler, Deceased.*